Patented Sept. 19, 1950

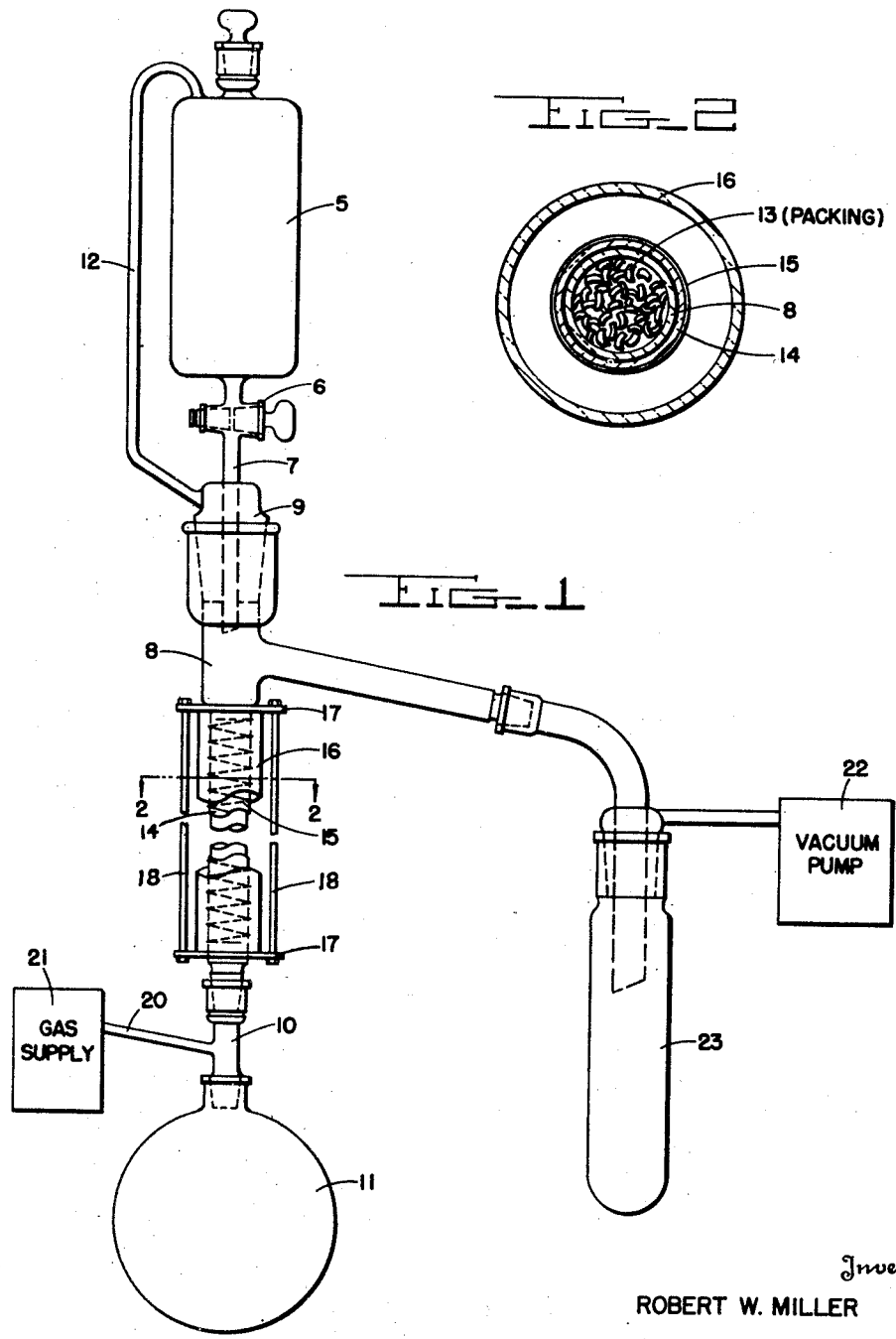

2,522,529

UNITED STATES PATENT OFFICE 2,522,529

DISTILLATION OF ALCOHOLS FROM DIBASIC ACID DIESTERS

Robert W. Miller, United States Navy, and John K. Wolfe, Bethesda, Md.

Application January 8, 1946, Serial No. 639,883

1 Claim. (Cl. 202—47)

(Granted under the act of March 3, 1883, as amended April 30, 1928; 370 O. G. 757)

This invention relates to a method of removing volatile matter from liquids, and more particularly to a method of removing volatile matter from higher esters, dibasic acid diesters, and other similar liquids.

In the purification of liquids, where the impurities are readily volatile at temperatures sufficiently different from that at which the liquid to be purified is volatile and where the requisite temperature for fractional distillation is not so high as to produce thermal decomposition of the liquid to be purified, fractional distillation is often employed. However, where either of these two conditions is not met, removal of impurities by distillation is very difficult and often impractical. For example, in the preparation of higher synthetic esters, it has been found that even after the esters have been distilled under diminished pressure and have been subjected to a subsequent adsorption purification, as is often the practice, almost invariably small quantities of unreacted alcohol will be present. For some uses this small quantity is not sufficient to render the material unsuitable; however, where the ester is to be used as an instrument oil, power transmission fluid, or for other similar uses, it is considered advisable to remove entirely the last traces of alcohol in order to reduce the evaporation rate of the liquid to that of the pure diester and to avoid possible influences on the surface properties and viscosity of the liquid. Repeated distillation under diminished pressure will reduce the alcohol content but it will not remove the alcohol completely and in addition due to the heat required for distillation and the extended period for which the liquid must be subjected to this heat in order to remove as much alcohol as possible, thermal decomposition of the diester occurs and this seriously impairs the value of the liquid as a lubricant. To some extent thermal decomposition may be avoided by distillation in a molecular still at pressures of one to ten microns or lower, however, this method of distillation requires elaborate apparatus and is uneconomical because of the low rate of production and the high unit cost where large quantities are to be produced.

An object of the present invention is to provide a method for removing volatile matter from liquids and particularly for removing volatile matter from higher esters, dibasic acid diesters, and other similar liquids.

A further object of the present invention is to provide a method of removal of volatile matter from liquids by which thermal decomposition of the liquid is avoided.

In accordance with one embodiment of this invention, a stripping apparatus may be provided in which the liquid to be purified is caused to pass downwardly through a heated fractionating column which is packed with a material suitable to cause a large surface area of the liquid to be exposed. The system is operated at reduced pressure and a countercurrent of an inert gas is allowed to pass upwardly through the column and into a condensation trap, the gas serving to sweep away the volatile impurities as they volatilize.

Other objects and advantages of the present invention will be apparent from the following detailed description taken in conjunction with the drawings, wherein:

Fig. 1 shows schematically a stripping apparatus for use in accordance with this invention, and Fig. 2 is an enlarged, transverse, sectional view, taken substantially along the line 2—2 of Fig. 1 and showing in detail the assembly of the fractionating column.

Referring now to the drawings, it will be seen that a reservoir 5 is provided and is connected through a stopcock 6 and a short tube 7, located at the base of the reservoir, to the upper end of a tubular fractionating column 8, a suitable fitting 9 being mounted in the upper end of the column 8 to provide an airtight connection. The lower end of the column 8 is connected through a short coupling 10 to a receiving flask 11. Since this stripping apparatus is operated as a closed system, a by-pass tube 12 is provided which is connected at its upper end to the upper end of the reservoir 5 and at its lower end to the upper end of the fractionating column 8 through the fitting 9. The by-pass tube 12 equalizes the pressure in the upper portion of the reservoir 5 and the column 8, thus assuring an unimpeded flow of the liquid to be purified from the reservoir to the fractionating column.

As may be seen in Fig. 2, the column 8 is packed with a material 13 which will permit the liquid to be purified to pass readily through the column while causing a large surface area of the liquid to be exposed as it passes through the column. While small helices, which may be made of glass, have been shown at 13, Berl saddles or other packing material may be employed instead, the two primary requisites of the packing material being that it causes a large surface area of the liquid to be so exposed and at the same time not retain any substantial amount of the liquid, as would be the case where, for example, glass wool were employed.

In order to heat the liquid to be purified as it passes downwardly through the fractionating column to cause volatilization of the matter to be removed in this stripping operation, a tube 14 of an electrical insulating material such as glass is mounted about the column 8, the tube 14 having an internal diameter only sufficiently greater than the exterior diameter of the column 8 to permit easy insertion and removal of the column. The tube 14 serves as a support for a resistance wire 15 which is spirally wound about the tube and in direct contact therewith, the wire being connected to a suitable source of electrical energy, not shown, whereby the desired degree of heat may be applied to the column 8. Other heating means may well be substituted for the resistance wire, such as a current of heated air or a water jacket, as are well known to the art. A uniform temperature is maintained throughout the heated portion of the column and loss of heat reduced by mounting a tubular housing 16 about the tube 14, the housing being substantially larger than the tube 14 and concentrically disposed with respect thereto. Annular end plates 17 are mounted at either end of the housing 16, being retained thereon by suitable rods 18, fixed to and extending between the end plates. The end plates serve both to support the housing on the column and to close the ends of the housing to provide a dead air space between the housing and the column.

In the operation of this stripping apparatus the column is heated to the desired temperature and the liquid to be purified is permitted to drip through the column at a predetermined rate, the rate depending on the temperature used, the nature of the liquid to be purified and the rate at which the volatile matter may be conveniently removed therefrom. Since these factors represent variables difficult to evaluate in advance, ordinarily it is necessary to ascertain the optimum operating conditions experimentally. However, it has been found that in purifying many esters a temperature of between 80° C. and 150° C. is satisfactory at a flow rate of approximately one to two drops per second, the flow rate being determined by the adjustment of the stopcock 6. As the liquid drips through the column, a countercurrent of an inert gas, such as carbon dioxide, nitrogen and helium which are gases incondensible at normal temperature and pressure is caused to flow upwardly through the column, the gas entering the column at the base thereof through the coupling 10 and a capillary tube 20 connected thereto, whereby a suitable flow of gas is maintained, the capillary tube 20 being connected to a suitable source, indicated by the block 21, of the gas.

The upward flow of the gas producing the countercurrent is established by a vacuum pump 22 which is connected through a condensation chamber 23 to the upper end of the fractionating column, and is made sufficient to prevent any accumulation of volatilized matter in the fractionating column. The degree of vacuum to be employed depends on the liquid being purified and in purifying an ester under the conditions enumerated hereinbefore, a pressure of five millimeters of mercury, or less, has been found to be satisfactory. It will be apparent that the vacuum so obtained in addition to directing the flow of gas, also materially expedites the volatilization of the volatile matter by reducing the pressure and consequently the temperature to which the liquid must be heated to cause volatilization.

As the liquid being purified passes downwardly through the fractionating column, it is heated and maintained at the temperature to which it is heated for a period of time substantially equivalent to the length of time required for the liquid to pass from the upper end of the frictionating column to the lower end. This period is substantially less than the period for which the liquid would necessarily be subjected to elevated temperature in a conventional distillation process. This reduction in the length of time for which the liquid is heated in combination with the lower temperature made possible by the reduced pressure enables substantially complete avoidance of thermal decomposition of the liquid being purified. At the same time purification of the liquid is as complete as under any presently known process. The countercurrent of gas in the fractionating column in effect sweeps up the volatile impurities as they volatilize and carries them into the condensation chamber 23 where they are collected.

It is desirable that the condensation chamber be maintained at as low a temperature as feasible and this may be conveniently effected in practice by immersing the chamber in Dry Ice, where a small chamber is used, or where a large chamber is employed as in large scale purification, a refrigerating apparatus, not shown, may be associated with the chamber. The condensation chamber serves primarily as a trap and prevents the impurities from reaching the vacuum pump where damage to the pump might be caused, as, for example, where an oil type vacuum pump is employed, dilution of the oil might occur.

It has been found in practice that by employing the method of this invention, higher esters, dibasic acid diesters, and other similar materials which would ordinarily be subject to charring at conventional distilling temperatures, may be readily purified and freed of volatile impurities. The scope of the utility of this invention is however not limited to such materials but includes many other materials which may be purified in a distillation operation and from which it is desired to remove substantially completely volatile impurities. Because the rate of production is relatively high while the cost of operation and maintenance very low, purification of materials by this invention is inexpensive.

While but one embodiment of this invention has been shown and described, it will be understood that many changes and modifications may be made therein without departing from the spirit or scope of the present invention.

The invention shown and described herein may be manufactured and used by or for the Government of the United States of America for governmental purposes without the payment of any royalties thereon or therefor.

What is claimed is:

A method of separating the last traces of unreacted alcohol from a higher dibasic acid diester of the alcohol containing the same, said diester being of lubricating consistency, which liquid mixture is susceptible to thermal decomposition therein upon being subjected to repeated distillation under reduced pressure to remove the alcohol, which comprises, introducing the liquid mixture dropwise into the upper portion of a vertically disposed column over packing contained therein capable of causing substantial attenuation of the liquid mixture and of not retaining any substantial amount of the liquid, flowing the liquid mixture downwardly through the column in thin films under a reduced pressure of not more than about 5 mm. of mercury while heating it to a temperature of from 80° to 150° C. which is below that at which decomposition in the liquid mixture can take place but high enough to cause volatilization of the alcohol, introducing into the bottom portion of the column a stream of an inert gas which is incondensible under normal temperature and pressure, applying a suction to the upper portion of the column of a degree sufficient to draw said inert gas upwardly through the column in countercurrent contact with the downwardly flowing thin films of the liquid mixture and to provide the aforementioned reduced pressure thereon, said inert gas entraining volatized alcohol in its passage upwardly through the attenuated liquid mixture, and continuously withdrawing said inert gas and the entrained alcohol vapors from the upper portion of the column.

ROBERT W. MILLER.
JOHN K. WOLFE.

REFERENCES CITED

The following references are of record in the file of this patent:

UNITED STATES PATENTS

| Number | Name | Date |
| --- | --- | --- |
| 1,942,767 | Oman et al. | Jan. 9, 1934 |
| 2,218,279 | Clayton | Oct. 15, 1940 |
| 2,298,064 | MacMullin | Oct. 6, 1942 |
| 2,363,692 | Reed | Nov. 28, 1944 |